(12) United States Patent
Segawa et al.

(10) Patent No.: US 7,023,436 B2
(45) Date of Patent: Apr. 4, 2006

(54) THREE-DIMENSIONAL MODEL PROCESSING DEVICE, THREE-DIMENSIONAL MODEL PROCESSING METHOD, PROGRAM PROVIDING MEDIUM

(75) Inventors: Hiroyuki Segawa, Kanagawa (JP); Norikazu Hiraki, Tokyo (JP); Hiroyuki Shioya, Tokyo (JP); Yuichi Abe, Tokyo (JP)

(73) Assignee: Sony Corporation, Tokyo (JP)

( * ) Notice: Subject to any disclaimer, the term of this patent is extended or adjusted under 35 U.S.C. 154(b) by 172 days.

(21) Appl. No.: 10/019,575

(22) PCT Filed: Apr. 18, 2001

(86) PCT No.: PCT/JP01/03328

§ 371 (c)(1),
(2), (4) Date: May 20, 2002

(87) PCT Pub. No.: WO01/80188

PCT Pub. Date: Oct. 25, 2001

(65) Prior Publication Data

US 2002/0149583 A1 Oct. 17, 2002

(30) Foreign Application Priority Data

Apr. 19, 2000 (JP) ............................. 2000-117849

(51) Int. Cl.
*G06T 17/00* (2006.01)

(52) U.S. Cl. ...................... 345/420; 345/679; 345/653; 345/664; 382/305

(58) Field of Classification Search ................ 345/420, 345/679, 664, 663, 419, 653; 703/2; 382/232, 382/305
See application file for complete search history.

(56) References Cited

U.S. PATENT DOCUMENTS 6,792,398 B1 * 9/2004 Handley et al. ............... 703/2

FOREIGN PATENT DOCUMENTS

| JP | 64-28719 | 1/1989 |
|----|----------|--------|
| JP | 5-224853 | 9/1993 |
| JP | 5-282426 | 10/1993 |
| JP | 7-282115 | 10/1995 |
| JP | 10-20914 | 1/1998 |
| JP | 2000-194736 | 7/2000 |

\* cited by examiner

*Primary Examiner*—Kimbinh T. Nguyen
(74) *Attorney, Agent, or Firm*—Bell, Boyd & Lloyd LLC

(57) ABSTRACT

A three-dimensional model processing apparatus is provided. The three-dimensional model processing apparatus can more really carry out a processing change of shape, color, and the like with respect to a three-dimensional object being displayed on a display by allowing an operator to operate an object tool in which a position change and an orientation change can be made and an editing tool in which relative distance with respect to the object tool can be changed to relatively move both tools such that the relative position between the object tool and the editing tool is detected to execute processing corresponding to, for example, shape change or color processing determined by the corresponding editing tool, thereby modifying attribute data of the object being displayed.

11 Claims, 17 Drawing Sheets

THREE-DIMENSIONAL MODEL PROCESSING DEVICE, THREE-DIMENSIONAL MODEL PROCESSING METHOD, PROGRAM PROVIDING MEDIUM

BACKGROUND OF THE INVENTION

This present invention generally relates to three-dimensional model processing. More specifically, the present invention relates to a three-dimensional model processing apparatus, a three-dimensional model processing method and a program providing medium implementing three-dimensional model processing.

In the field of computer graphics, various techniques have been developed and realized with respect to apparatuses or methods for displaying a three-dimensional graphic on a display to execute processing to modify the orientation, shape, or the like of the displayed three-dimensional graphic. One such technique includes a method of inputting shape data of an object including depth data by using, for example, a mouse or a two-dimensional tablet. Further, there is also used a method of acquiring data of actual three-dimensional objects by a three-dimensional digitizer or a three-dimensional scanner to acquire display data. In addition, as a method of carrying out processing such as deformation of an object displayed on a display, there is known a configuration using an input unit composed of a glove type manipulator.

An example of the configuration of a shape change processing apparatus using the glove type manipulator is shown in FIG. 1. In FIG. 1, an operator dons a head mounted display 10 to observe a display object 30. Further, a glove type manipulator 11 is fitted over or attached to the operator's hand.

Pressure sensors or magnetic sensors for detecting movements of the operator's hand and fingers are attached to the manipulator 11. A detection signal is input to a control unit 20 through an I/O interface 22. A CPU 21 executes processing in accordance with a program stored in a ROM 24 or a RAM 25, and executes processing to modify display parameters relating to the display object 30 in accordance with the detection signal. Display object 30 is updated based on the new display parameters through display control means 23.

For example, when an operator executes an operation to "shave" the side surface of the display object 30 by using the glove type manipulator 11, a sensor attached to the manipulator 11 detects the shaving operation of the manipulator 11, and the CPU 21 changes the display parameters relating to the display object 30 on the basis of the detection signal input through the I/O interface 22. Once the display object 30 is updated, the head mounted display 10 displays the display object 30 including the shaved portion 31.

As stated above, in conventional three-dimensional modeling systems, various input techniques are used. In a previously described processing system using a mouse or a two-dimensional tablet, processing is input using two-dimensional information. Therefore, a feeling of restriction and/or disagreement may exist with respect to the operation of the three-dimensional object. Further, various processing such as movement, deformation, cutting, and the like with respect to the displayed object must be carried out by using only a single editing tool, for example, a mouse. This may result in the operator having difficulty intuitively grasping the proper setting of the editing tool.

Input data from a three-dimensional digitizer and/or a three-dimensional scanner are useful for entering the shape of virtual objects, but are not suitable for deformation processing and the like of three-dimensional objects. Furthermore, such input units are very expensive.

It is desirable that input processing resulting from manipulation of a glove type manipulator is intuitive to the operator. However, in practice, initialization processing is required before actual manipulation processing may be carried out. For example, a "push" operation or a "pull" operation, with respect to the object, may be required to initialize the settings of the glove type manipulator. This may result in a drawback that operating the glove type manipulator may be difficult for a user who is unfamiliar with the glove type units. Moreover, these glove type input units are also very expensive.

SUMMARY OF THE INVENTION

An advantage of the present invention is that it provides a three-dimensional model processing apparatus, a three-dimensional model processing method and a program providing medium for storing instructions for implementing a three-dimensional model processing method in which an operator operates respective tools in a form closer to more practical processing by using virtual objects and various tools corresponding to respective processing, thereby making it possible to execute various processing of objects such as shape change, surface coloring, and the like.

To this end, in an embodiment according to the present invention, a three-dimensional model processing apparatus is provided. The three-dimensional model processing apparatus includes a display unit for three-dimensionally displaying an object and an object tool representing the displayed object, wherein the object tool is capable of three-dimensional movement such that the position and the orientation of the object tool can be changed. Also included are an editing tool in which relative distance with respect to the object tool can be changed and a processor for detecting the relative position between the object tool and the editing tool. Preferably, the processor is configured to execute processing determined by the editing tool to modify attribute information of the displayed object on the basis of the detected relative positional information.

In an embodiment, the processor is further configured to detect position information of the object tool based on changes in the position and the orientation of the object tool. Preferably, this detected position information is used to modify the attribute information of the displayed object. In an embodiment, the processor is further configured to execute processing corresponding a number of different types of editing tools. In an embodiment, the detected relative position information includes at least one of the relative distance between the object tool and the editing tool and the relative angle between the object tool and the editing tool. Preferably, the attribute information of the displayed object is attribute information relating to at least one of shape, color and sound. Further, the processor is configured to execute functional operation of the displayed object as processing determined by the editing tool.

In another embodiment according to the present invention, a three-dimensional model processing method is provided. Also provided are an object that is three-dimensionally displayed on a display unit, an object tool representing the displayed object and an editing tool. The object tool is capable of three-dimensional movement such that the position and the orientation of the object tool can be changed and the editing tool is capable of three-dimensional movement such that the relative position between the editing tool and the object tool can be changed. The three-dimensional model processing method includes the steps of detecting the relative position between the object tool and the editing tool and executing processing determined by the editing tool to modify attribute information of the displayed object on the basis of the detected relative position information.

In an embodiment, the three-dimensional model processing method further includes the steps of detecting position information of the changed object tool based on changes in the position and the orientation of the object tool and modifying the attribute information of the displayed object based on the detected position information. In an embodiment, the three-dimensional model processing method further includes the steps of selecting the editing tool from a plurality of different types of editing tools and executing processing corresponding to the type of editing tool selected.

In an embodiment, detected relative position information is at least one of the relative distance between the object tool and the editing tool and the relative angle between object tool and editing tool. In an embodiment, the attribute information of the displayed object is attribute information relating to at least one of shape, color and sound. In a further embodiment, the three-dimensional model processing method includes the step of executing functional operation of the displayed object as processing determined by the editing tool.

In yet another embodiment according to the present invention, a computer readable medium storing a computer readable program is provided. Also provided are an object that is three-dimensionally displayed on a display unit, an object tool representing the displayed object and an editing tool. The object tool is capable of three-dimensional movement such that the position and the orientation of the object tool can be changed and the editing tool is capable of three-dimensional movement such that the relative position between the editing tool and the object tool can be changed. The computer readable program includes the steps of detecting the relative position between the object tool and the editing tool and executing processing determined by the editing tool to modify attribute information of the displayed object on the basis of the detected relative position information.

Additional features and advantages of the present invention are described in, and will be apparent from, the following Detailed Description of the Invention and the Figures.

DETAILED DESCRIPTION OF THE INVENTION

Figure 1:
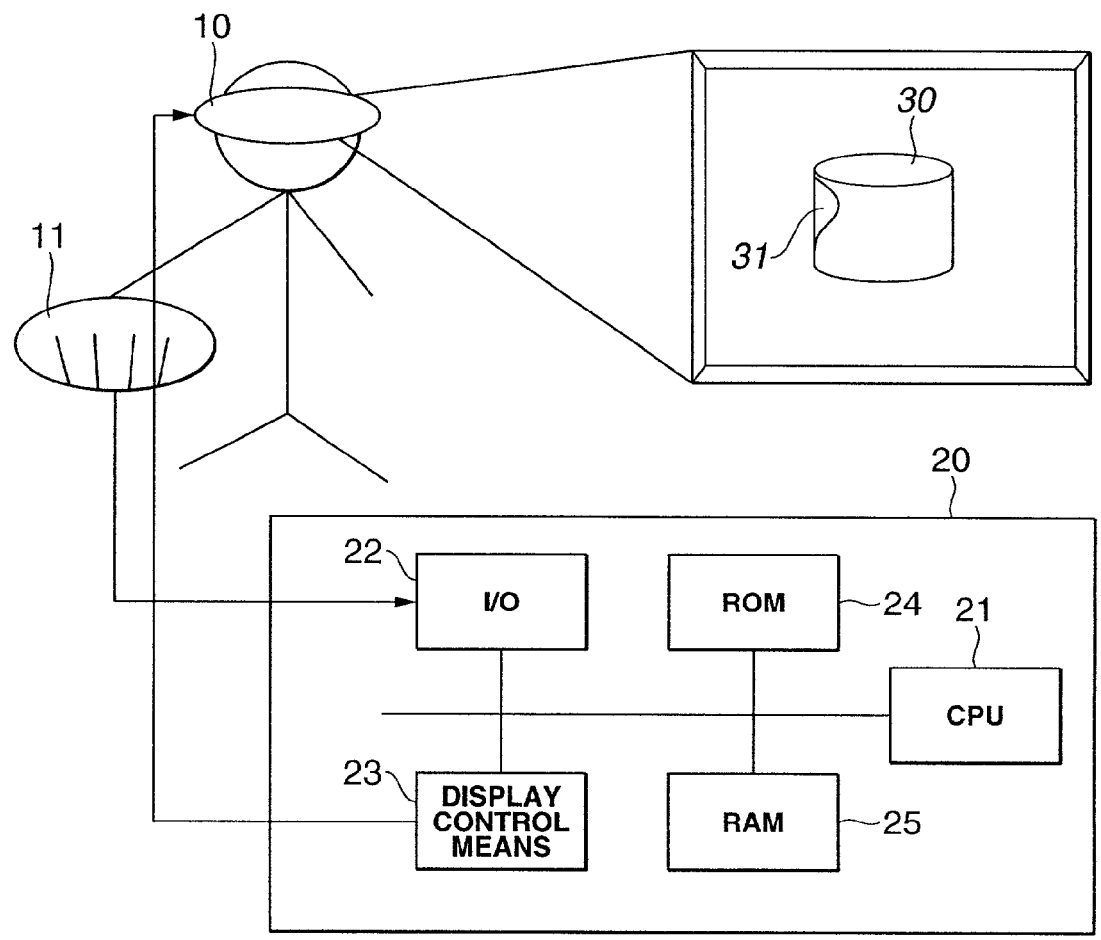
FIG. 1 is a schematic diagram showing a conventional three-dimensional model processing configuration using a glove type manipulator.
Figure 2:
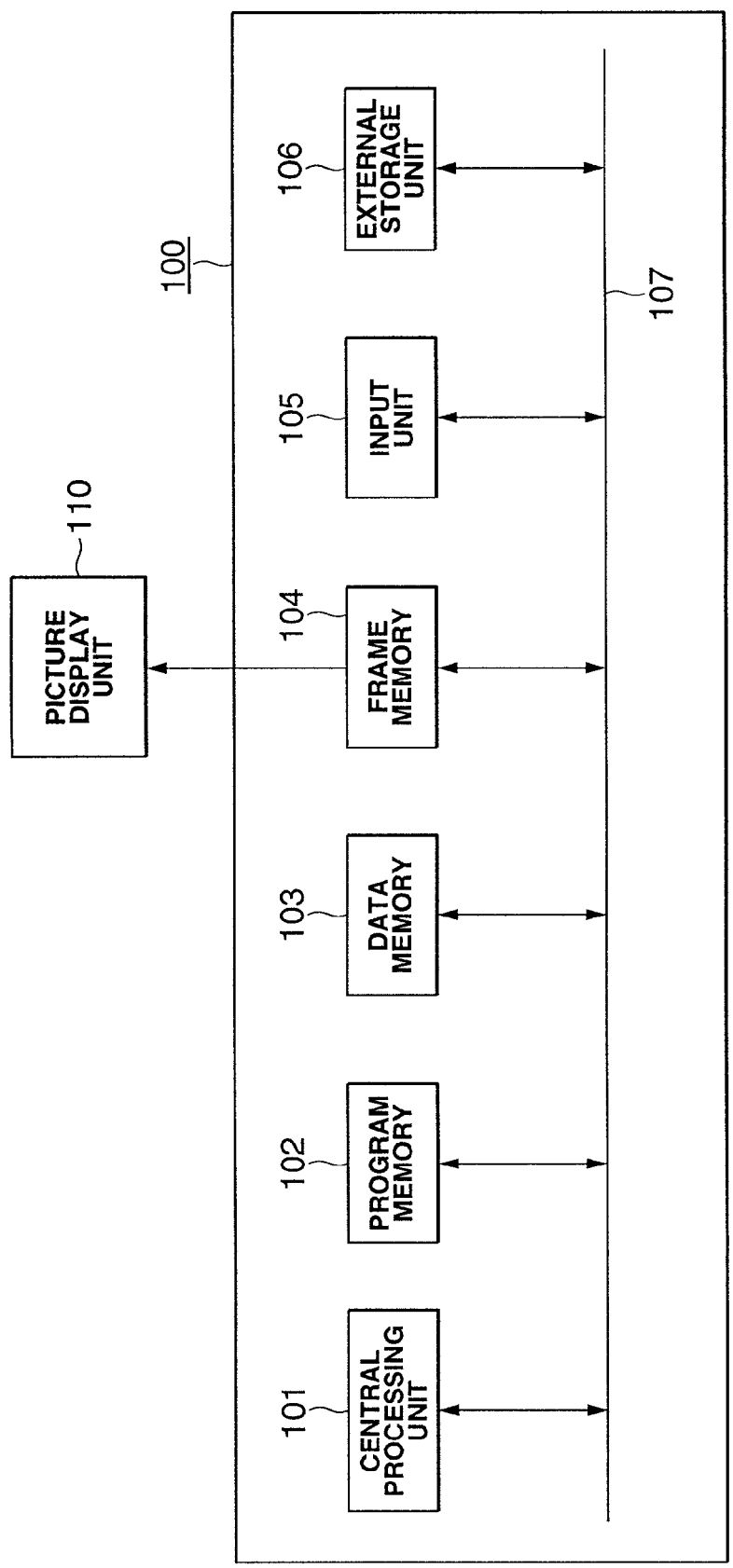
FIG. 2 is a schematic diagram showing an embodiment of a three-dimensional model processing apparatus according to the present invention.

FIG. 2 is a schematic diagram showing an embodiment of a three-dimensional model processing apparatus according to the present invention. The three-dimensional model processing apparatus 100 includes a central processing unit (CPU) 101 for executing a processing program, a program memory 102 into which a processing program is stored, and a data memory 103 in which processing data and information such as attribute data of position, orientation, shape, color, and the like of the object to be edited or attribute data of the editing tool, and the like are stored. Also included are a frame memory 104 in which picture information for displaying, on a picture display unit 110, the object to be edited, the editing tool, an instruction to user, and the like are stored, an input unit 105 for inputting various instructions with respect to the object to be edited, an external storage unit 106 for storing observation information or a processing result, and a bus 107 for permitting data transfer between the respective units. The picture display unit 110 is connected through the frame memory 104. Thus, picture data stored in the frame memory 104 may be displayed.

The input unit 105 includes a number of tools for carrying out various processing such as deformation, surface color change, and the like with respect to the object to be edited (i.e., the object being displayed on the display unit or the displayed object).

Figure 3:
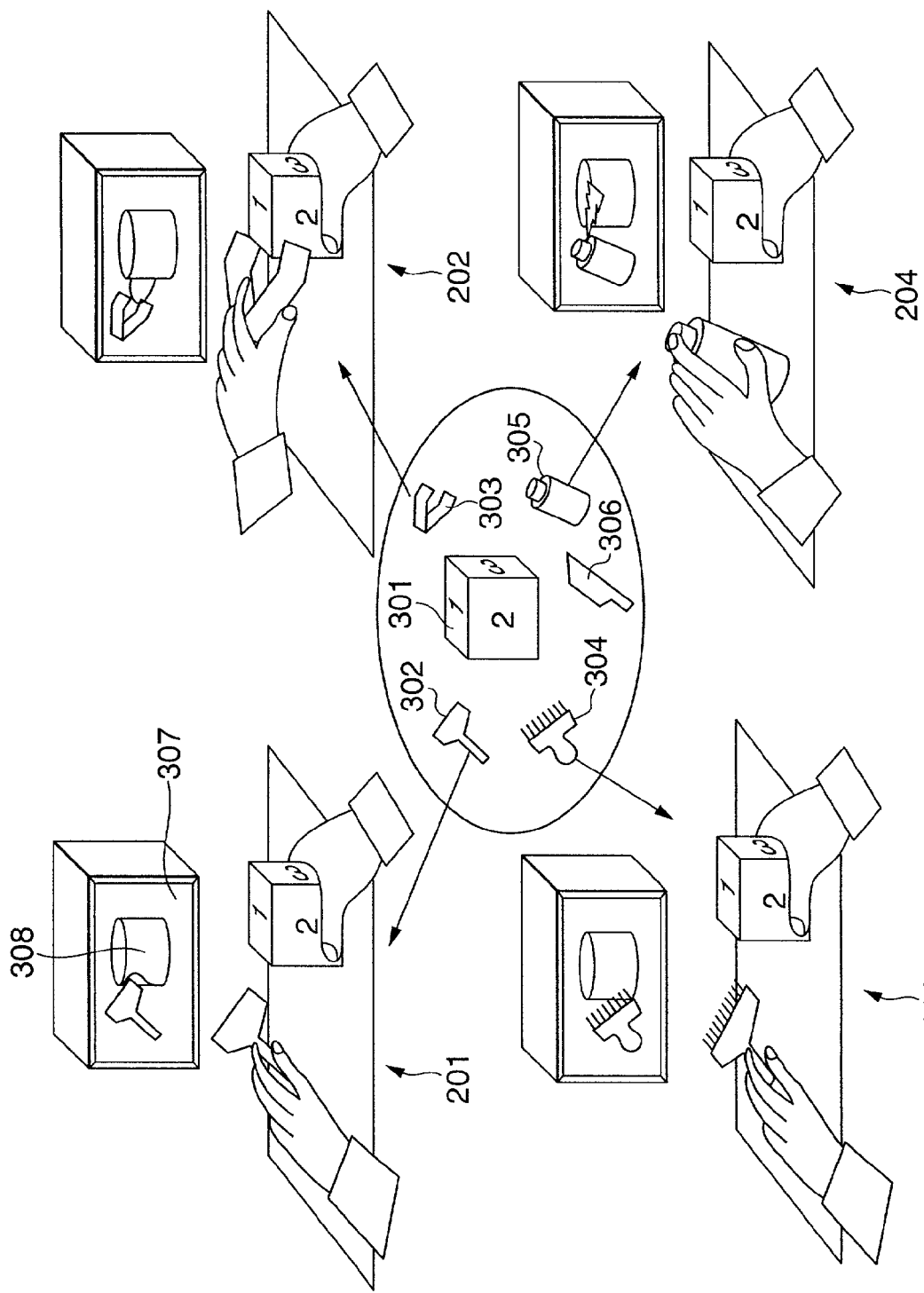
FIG. 3 is a schematic diagram illustrating processing in a three-dimensional model processing apparatus according to an embodiment of the present invention.

A three-dimensional model processing apparatus according to an embodiment of the present invention includes, as shown in FIG. 3, an object tool 301 corresponding to the displayed object and editing tools 302 to 306 for implementing various processing to the displayed object. The object tool 301 and the editing tools 302 to 306 are also displayed on a display 307. By using these tools, processing such as deformation, coloring, and the like with respect to displayed object 308 may be executed.

As shown in FIG. 3, the editing tools 302 to 306 include a push tool 302 having, for example, the shape of a trowel for executing a "push" operation with respect to the displayed object 308; a pull tool 303 having the shape of a pinch or tongs for executing a "pull" operation with respect to the displayed object 308; a brush tool 304 having, for example, the shape of a brush for executing a "fine coloring" operation with respect to the displayed object 308; a spray tool 305 having, for example, the shape of a can of spray paint for executing a "rough coloring" operation with respect to the displayed object 308; and a cut tool 306 having, for example, the shape of a knife for executing a "cut off, separate" operation with respect to the displayed object 308.

The operator operates the editing tools 302 to 306 in a predetermined action area (e.g., a sensor detection area) as indicated by action areas 201 to 204 in FIG. 3, thereby causing a change in distance between the object tool 301 and the editing tools 302 to 306 and a change in the angle therebetween. As a result, processing corresponding to the respective tools, that is, deformation of the displayed object 308 corresponding to the "push" operation by the push tool 302 and the "pull" operation by the pull tool 303, and/or change of the surface color of the displayed object 308 corresponding to the brush tool 304 and the spray tool 305 are implemented to the displayed object 308.

In an embodiment, a clay model is used as the object tool 301 and is subjected to operations such as deformation, coloring, or the like. Information is input from a sensor for detecting the position and the orientation of the clay model in the three-dimensional space. The object tool 301 may be a three-dimensional shape as shown in FIG. 3, for example, a spherical shape or a shape approximate to the displayed object 308. The object tool 301 is configured such that the operator can hold it by one hand such that it may be freely moved or rotated.

The editing tool includes, as a parameter, information input from a sensor for detecting the position and the orientation of the editing tool in the three-dimensional space. The editing tool has a shape that operators can intuitively associate with a processing mode in accordance with the respective processing. For example, as shown in FIG. 3, the editing tool can be in the shape of a trowel as a push tool 302, the shape of a pinch or tongs as a pull tool 303, the shape of a brush as a brush tool 304, the shape of a can of spray paint as a spray tool 305, and the shape of a knife as a cut tool 306.

The object tool 301 and the editing tools 302 to 306 correspond to the input unit 105 in FIG. 2. An embodiment of the input unit will be described with reference to FIGS. 4 to 7. It is to be noted that, in FIGS. 4 to 7, the editing tools 302 to 306 are divided into a tool for deformation processing and a tool for color processing without classifying the type of tool being used.

Figure 4:
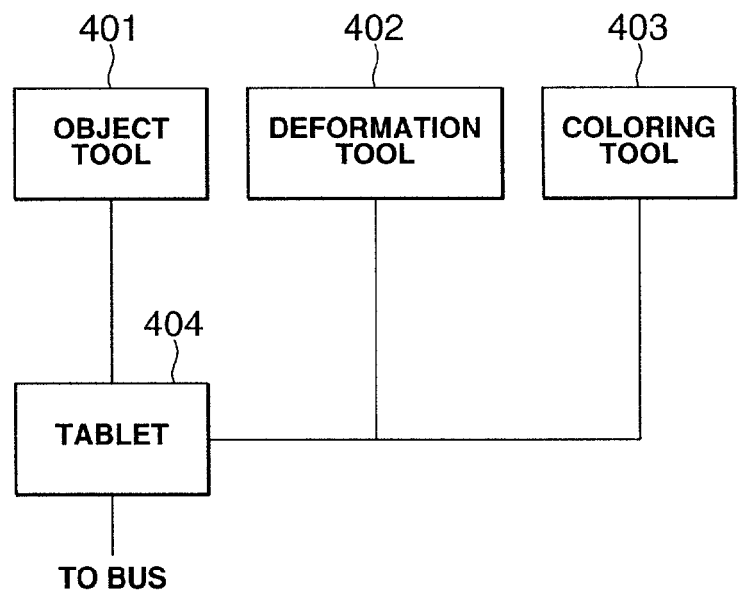
FIG. 4 is a block diagram showing an embodiment in which a tablet is used as an input unit in a three-dimensional model processing apparatus according to the present invention.

FIG. 4 is an embodiment where an input unit includes a tablet 404. Position information and orientation information of an object tool 401, a deformation tool 402 and a coloring tool 403 are detected by input through the input tablet 404. A detection function by a chip, a coil, or the like is added to the object tool 401, the deformation tool 402 and the coloring tool 403 similarly to an input pen associated with a conventional tablet. Thus, the position and the orientation information of the respective tools may be detected. For example, coils having different detection values are provided on the respective surfaces 1 to 6 of the object tool 301 of hexahedron shape as shown in FIG. 3. Thus, when the different detection values of the coils are obtained via the tablet 404, mounting surfaces are identified, thereby making it possible to obtain three-dimensional information from these mounting surfaces. Alternatively, a configuration may be employed in which Z-axis information obtained from other sources, such as an optical sensor, a magnetic sensor or the like is combined with XY axis (i.e., two-dimensional) information obtained from the tablet 404 to identify a three-dimensional position and to obtain three-dimensional data.

Figure 5:
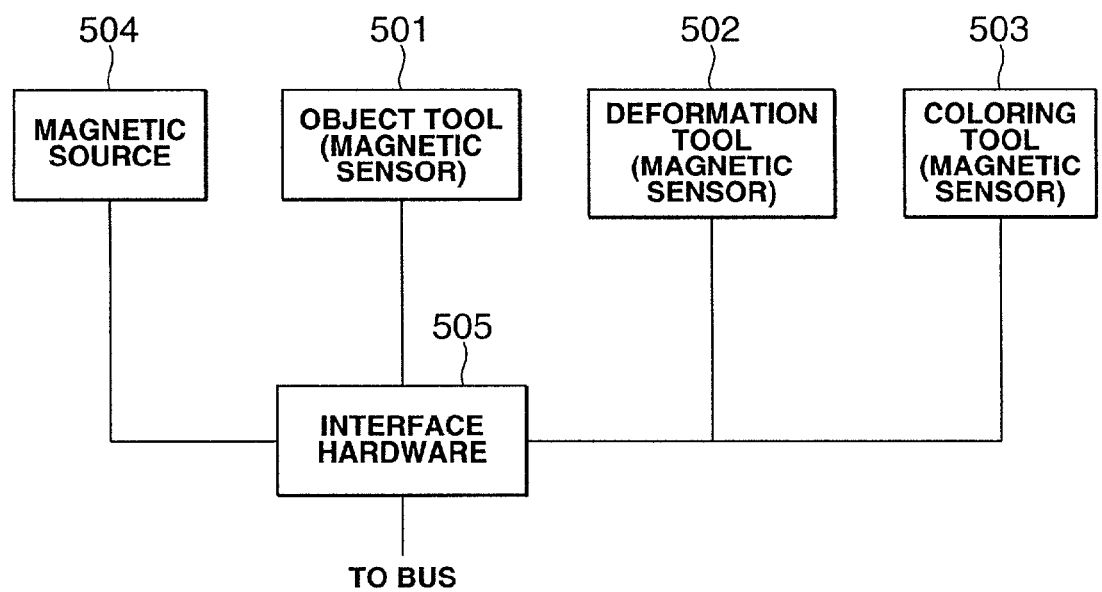
FIG. 5 is a block diagram showing an embodiment in which magnetic sensors are used in an input unit in a three-dimensional model processing apparatus according to the present invention.

FIG. 5 is an embodiment where an input unit includes magnetic sensors. The area within a magnetic field produced by a magnetic source 504 is an action area, and operations by an object tool 501, a deformation tool 502 and a coloring tool 503 are carried out within the action area. Magnetic sensors are respectively attached to the object tool 501, the deformation tool 502 and the coloring tool 503. These magnetic sensors output magnetic displacement data to dedicated interface hardware 505 within the action area. The dedicated interface hardware 505 calculates position information data and orientation information data of the respective tools on the basis of this data. In an embodiment, the dedicated interface hardware 505 shown in FIG. 5 may be replaced by a calculation processing software program.

Figure 6:
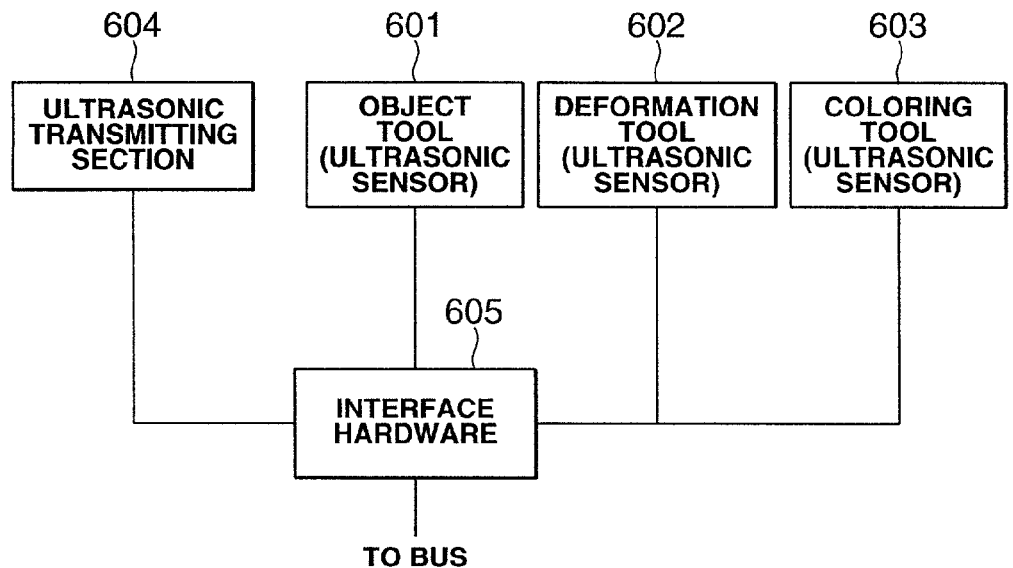
FIG. 6 is a block diagram showing an embodiment in which ultrasonic sensors are used in an input unit in a three-dimensional model processing apparatus according to the present invention.

FIG. 6 is an embodiment where an input unit includes ultrasonic sensors. The area where ultrasonic waves produced by an ultrasonic transmitting section 604 can be detected is an action area, and operations by an object tool 601, a deformation tool 602 and a coloring tool 603 are carried out within the action area. Ultrasonic sensors are respectively attached to the object tool 601, the deformation tool 602 and the coloring tool 603. These ultrasonic sensors detect arrival times from the source of an ultrasonic wave or the interference of ultrasonic waves and the like within the action area. Dedicated interface hardware 605 calculates position information data and orientation information source data of the respective tools on the basis of the detected data. In an embodiment, the dedicated interface hardware 605 shown in FIG. 6 may be replaced by a calculation processing software program.

Figure 7:
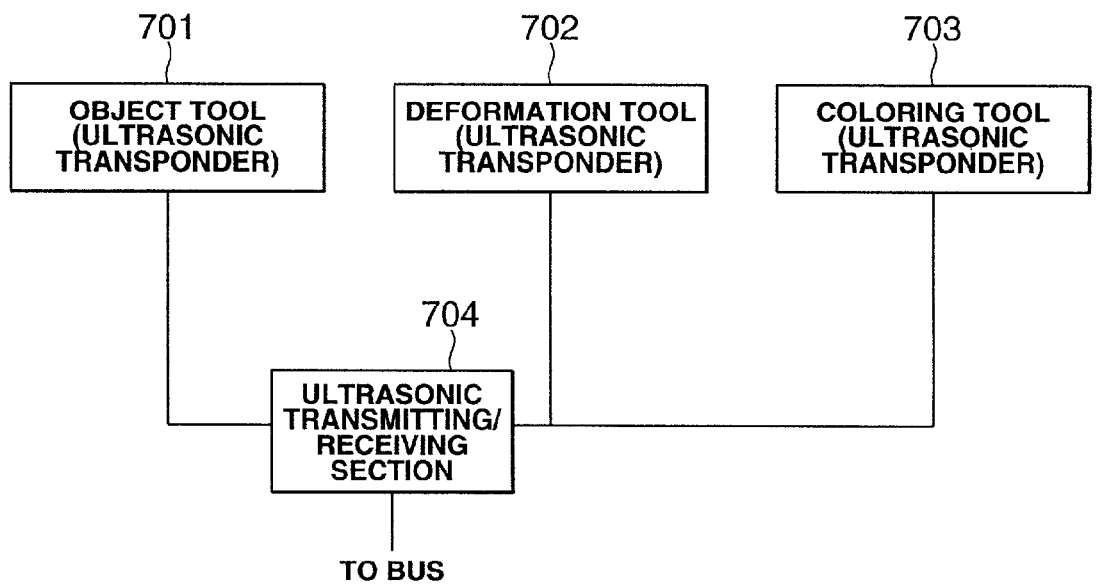
FIG. 7 is a block diagram showing an embodiment in which ultrasonic transponders are used in an input unit in a three-dimensional model processing apparatus according to the present invention.

FIG. 7 is an embodiment where an input unit includes an ultrasonic sensor. An ultrasonic transmitting/receiving section 704 transmits and receives ultrasonic waves. The area where ultrasonic waves produced by the ultrasonic transmitting/receiving section 704 can be detected is an action area. Processing operations by an object tool 701, a deformation tool 702 and a coloring tool 703 are carried out within the action area. Transponders having a function to receive ultrasonic waves produced by the ultrasonic transmitting/receiving section 704 and to send back ultrasonic waves are respectively attached at the object tool 701, the deformation tool 702 and the coloring tool 703. The ultrasonic transmitting/receiving section 704 receives ultrasonic waves sent back from the respective tools to detect a transmission time of the ultrasonic waves, interference of the ultrasonic waves, or the like to calculate position information data and orientation information source data of the respective tools on the basis of this data.

The input unit 105 shown in FIG. 2 is realized as an input device using various sensors as described above. In an embodiment, information input/output with respect to a three-dimensional model processing apparatus 100 from sensors of the respective tools may be configured as a data line of wire or a wireless data transmitting/receiving configuration. In an embodiment, the input unit 105 may include a combination of the various sensors.

In an embodiment, a random accessible memory medium such as a hard disk drive (HDD), an optical disk, or the like is desirable as the external storage unit 106 shown in FIG. 2. Additionally, the external memory unit may include a tape streamer or non-volatile semiconductor memory represented by a memory stick. Also, it is possible to utilize an external storage unit of another network-connected system. In an embodiment, the central processing unit (CPU) 101 executes processing in accordance with a processing program recorded in the program memory 102.

Figure 8:
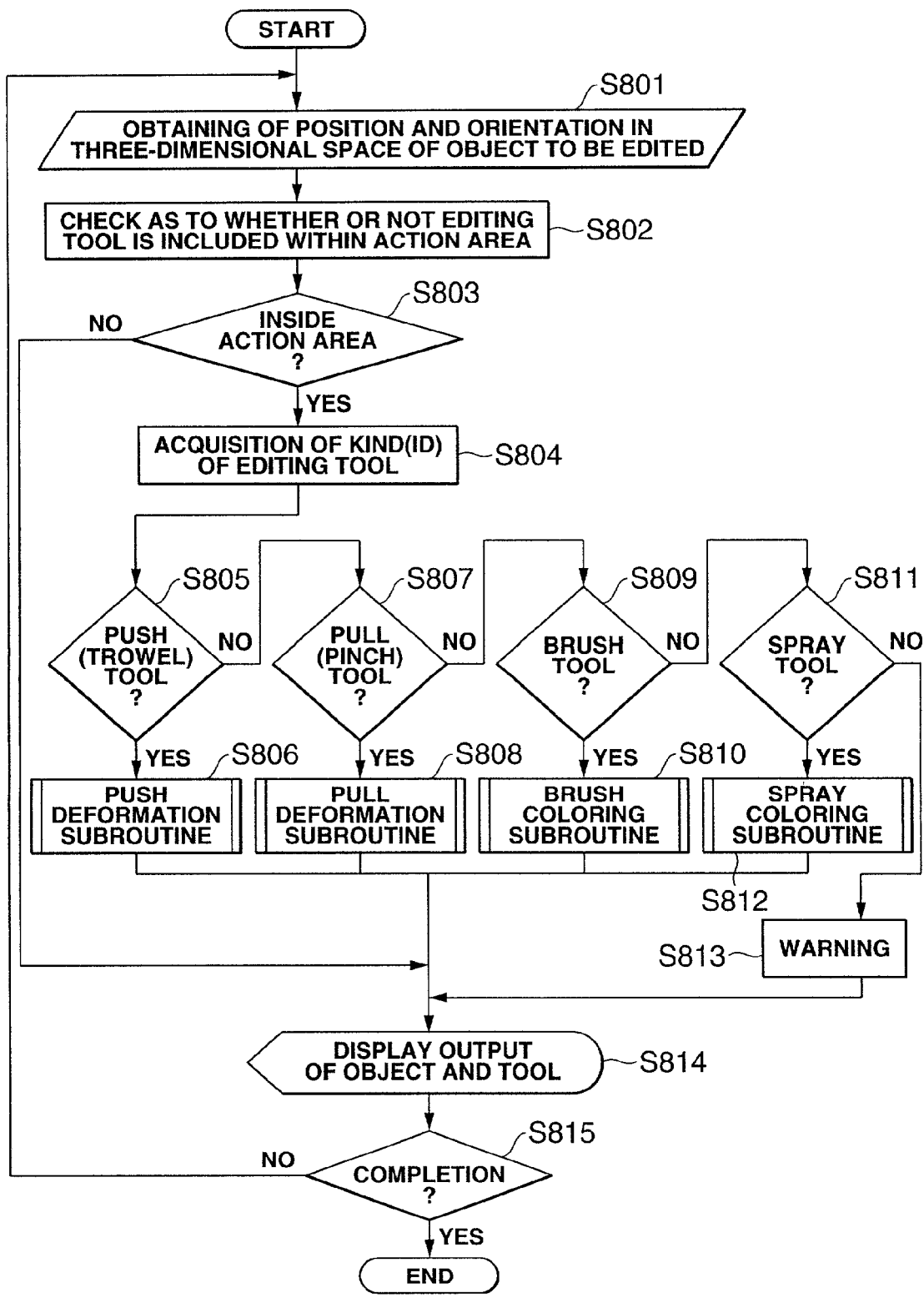
FIG. 8 is a flowchart illustrating processing in a three-dimensional model processing apparatus according to an embodiment of the present.

The flow of processing using the three-dimensional model processing apparatus shown in FIG. 2 will be described with reference to the flowchart shown in FIG. 8. The flowchart shown in FIG. 8 illustrates processing executed in accordance with a processing program recorded in the program memory 102. In FIG. 8, an embodiment will be explained using at least one of a push tool 302, a pull tool 303, a brush tool 304 (i.e., a coloring tool) and a spray tool 305 as an editing tool. In an embodiment, it is possible to use various types of editing tools not listed above for executing various types of processing.

Initially, at step S801, data of a position and an orientation in the three-dimensional space of the object to be edited (i.e., the displayed object) are acquired. This data corresponds to attribute data such as position, orientation, shape, color, and the like of the displayed object and is stored in the data memory 103 (shown in FIG. 2). An initial position of the object tool 301 (shown in FIG. 3) is set as a position and an orientation corresponding to this attribute data. Thereafter, the operator moves the object tool 301 within the action area (i.e., the area where position detection by a sensor can be made), the position and the orientation of the object tool are detected by a sensor output of the object tool 301, and the attribute data of the displayed object is rewritten in accordance with the movement. Thus, the appearance displayed object is updated on the picture display unit 110 on the basis of the rewritten attribute data.

Then, at step S802, a check is performed to determine whether the object tool and the editing tool are within the action area. The action area is the detectable area of the various sensors used as the input unit. As discussed above, various input units can be used in accordance with various embodiments of the present invention. For example, a tablet can be used as the input unit and the action area is the area of the tablet, a magnetic sensor can be used as the input unit and the action area is the detectable area of the magnetic sensor, or an ultrasonic sensor can be used as the input unit and the action area is the detectable area of the ultrasonic sensor.

When it is determined at step S803 that the tool is not within the action area, processing jumps to step S814. When it is determined that tool is within the action area, processing proceeds to step S804 to determine the type or kind (ID) of tool being used. The determination of the tool type is determined with respect to the type of editing being performed, such as deformation, coloring, and the like. With respect to the types of editing tools, the operator may designate the tool to input identification data (ID) indicating the tool type, or may employ a configuration for outputting an identification signal (ID) from the editing tool within the action area to identify the type of tool on the basis of the identification signal.

When the type of editing tool is determined at the step S804, processing proceeds to steps S805 to S812. Step S805 to the step S806 illustrates processing where the editing tool is a push tool, step S807 to the step S808 illustrate processing where the editing tool is a pull tool, step S809 to the step S810 illustrate processing where the editing tool is a brush tool, and step S811 to the step S812 illustrate processing where the editing tool is a spray tool. The processing illustrated by steps S806, S808, S810, S812 corresponds to subroutines of the respective tools, and are called when the editing tool is specified. Where the editing tool does not correspond to a known type of editing tool, processing proceeds to step S813, whereby a warning is produced, for example, displaying a warning message on the picture display unit 110 or outputting a warning sound. Explanation will be given below with reference to FIGS. 9 to 16 in connection with the respective processing of steps S806, S808, S810 and S812 (i.e., subroutine processing corresponding to the respective editing tools).

At step S814, the respective editing tools are displayed on the picture display unit 110, and display of the object processed by the editing tool is carried out. The display modes (form) of the respective editing tools are modes based on shape data set in advance for each editing tool. For example, if the editing tool is a push tool, the shape of a trowel is displayed on the picture display unit 110 or if the editing tool is a spray tool, the shape of a can of spray paint is displayed on the picture display unit 110. Moreover, the displayed object is displayed as an object to which deformation, coloring or the like is applied by each of the editing tools. Namely, as attribute data such as position, orientation, shape, color, and the like of the displayed object is modified by the editing tools, these changes are reflected and displayed on the picture display unit 110. Attribute data of the displayed object rewritten by the operator using the editing tools is stored into the data memory 103 (shown in FIG. 2).

Further, at step S815, a check is performed to determine if processing is completed. Processing may be completed by input from a user who is the operator, or from a rule prescribed within the processing application. For example, with a game program, processing may be completed by a completion command such as game over. In addition, the determination that processing is completed may be based on a hardware or software restriction such as memory full and the like. When it is determined at step S815 that processing is not completed, processing returns to the start of the processing flow to repeatedly execute similar processing.

Figure 9:
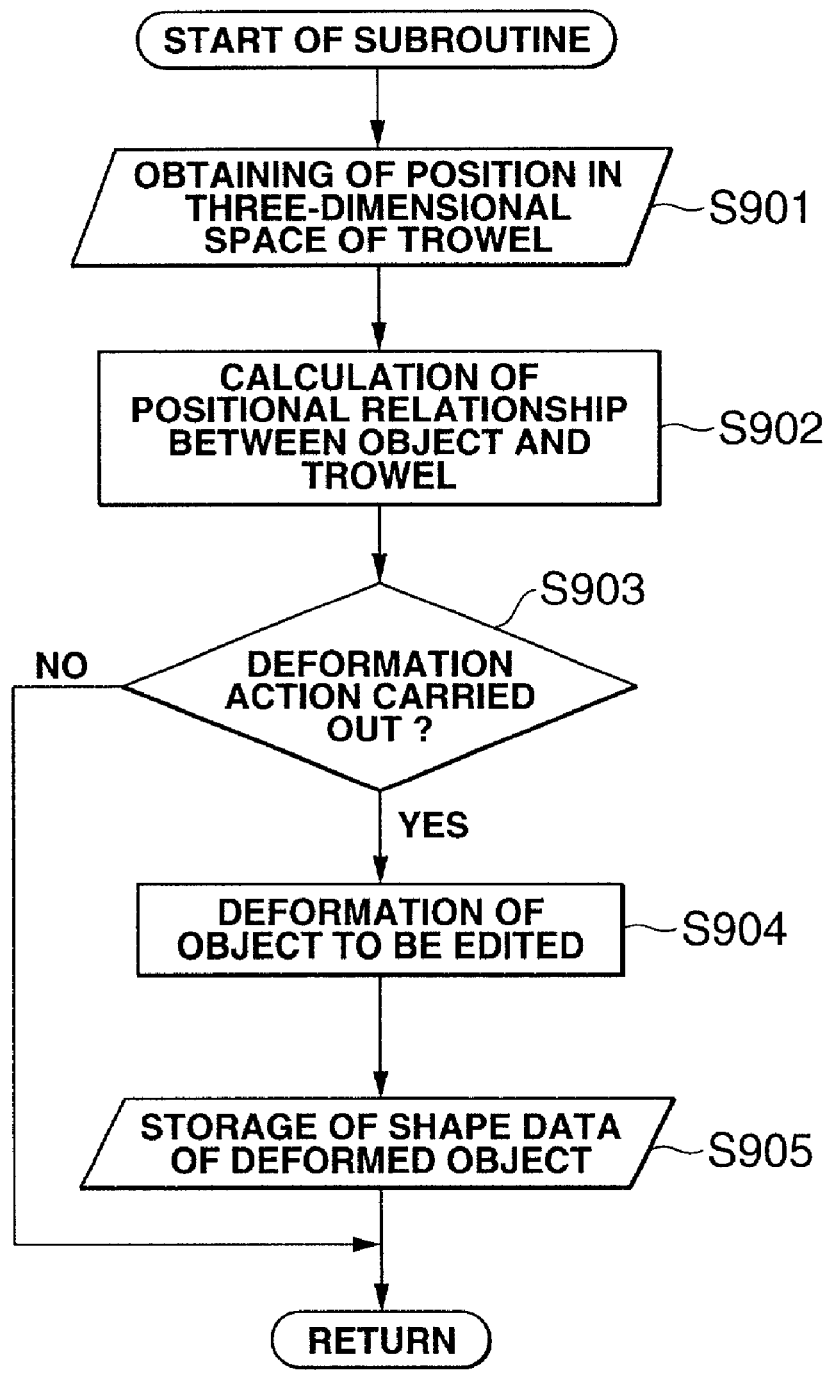
FIG. 9 is a flowchart illustrating processing where a trowel is used as an editing tool in a three-dimensional model processing apparatus according to an embodiment of the present invention.

FIG. 9 is a flowchart illustrating processing using a push tool to perform deformation of the displayed object. Step S901 is a step for obtaining position/orientation data on the three-dimensional space of a trowel being used as a push tool. As previously described, such data are data obtained on the basis of respective sensor outputs in accordance with the type of input unit utilized, for example, tablets, magnetic sensors, ultrasonic sensors or the like.

In step S902, a space relationship/relative position between the displayed object and the editing tool is determined based on the position/orientation data of the displayed object (acquired in step S801 of FIG. 8) and the position/orientation data of the trowel as the editing tool (obtained in step S901).

In step S903, a determination is made as to whether or not deformation of the displayed object by the trowel as the editing has been carried out. Put more simply, step 903 serves to determine whether or not position data of the editing tool as detected by various sensors overlaps with position data of the object tool (i.e., has the editing tool penetrated the displayed object). It is to be noted that it is not necessary that editing tools 302 to 306 actually penetrate the object tool 301. The apparatus may be configured to suppose that the editing has penetrated the displayed object if the distance between the object tool and the editing tool is less than a predetermined value. Alternatively, the object tool 301 may be composed of, for example, a deformable sponge shaped material such that the editing tool may actually penetrate the object tool 301. In an embodiment, deformation of the displayed object may be executed on the basis of the actual position data of the editing tool and the object tool.

Deformation processing of the object to be edited as displayed on the picture display unit 110 at step S904 can be realized by moving positions of vertices of polygons when the display data is polygons data. Where the distance between vertices is large, processing for generating new vertices is executed. Moreover, where the displayed object is represented as parametric curves, their control points are moved. Further, in the case where the displayed object is represented by voxels, deformation can be realized by (Boolean operation) processing to add data. The deformation processing is carried out in accordance with data mode (form). In either case, processing based on displacement data of the relative distance between object tool and editing tool is carried out.

After deformation processing of the displayed object is executed in step S904, the rewritten attribute data of the displayed object including the deformed result is stored into the data memory 103 or external storage unit 106 (shown in FIG. 2) in step S905.

In order to supplement the explanation of the flowchart shown in FIG. 9, explanation will be given with reference to the data flow diagram of FIG. 10 using the trowel as a push tool. The data flow diagram is a view showing the flow of data extending from a data source within the object to a target within another object via a process for converting data. The data flow diagram includes processes (indicated as ellipses) for converting data, data flows (indicated as arrows) for carrying data, actor objects (indicated as rectangles) indicating production and consumption of data, and data store objects (indication put between two lines) for passively carrying out storage of data.

Figure 10:
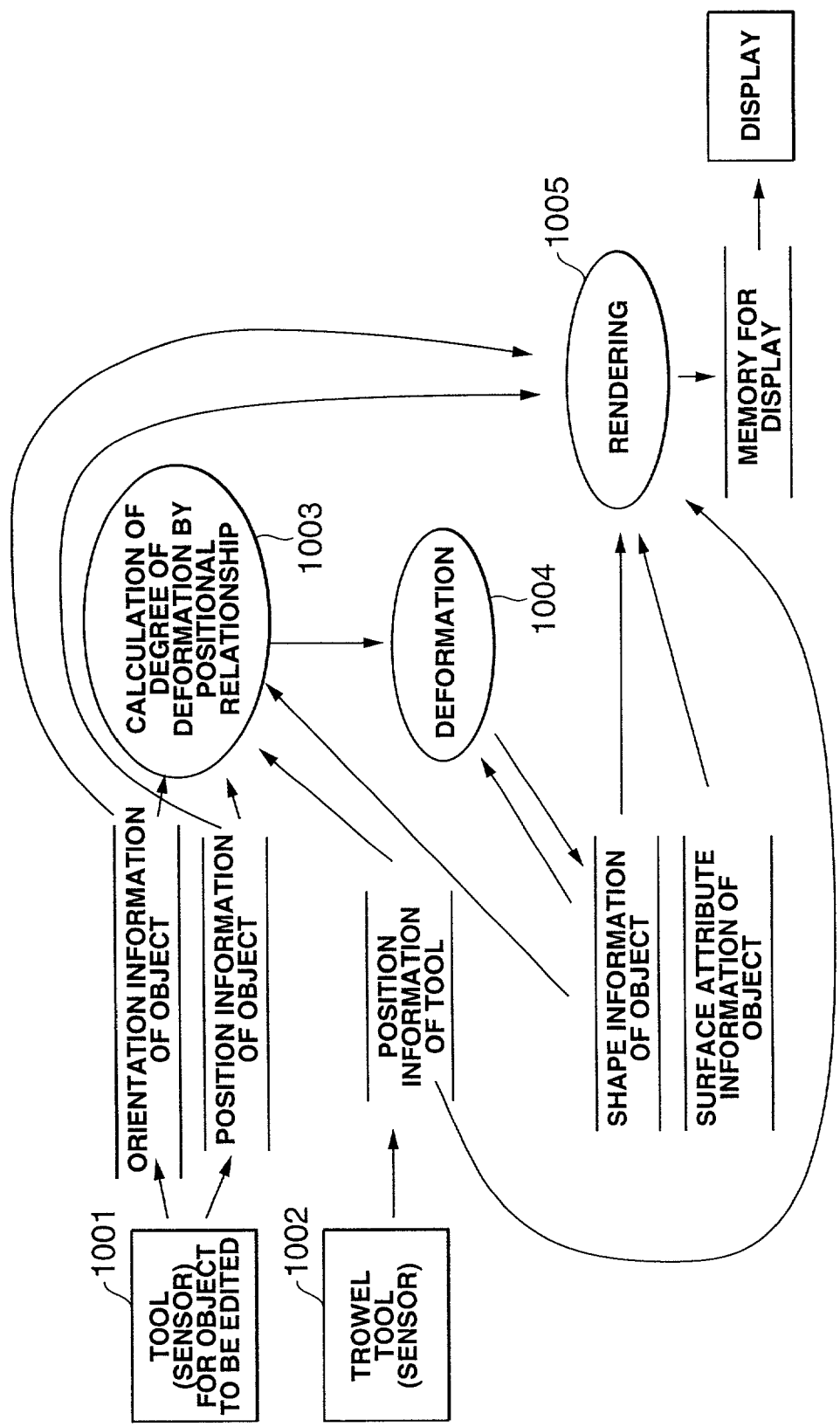
FIG. 10 is a data flow diagram illustrating processing where a trowel is used as an editing tool in a three-dimensional model processing apparatus according to an embodiment of the present invention.

The data flow of FIG. 10 illustrates processing using the trowel as a push tool. Processing is started by operation of the object tool (sensor) 1001 as an actor object and the trowel tool (sensor) 1002 as an actor object. From the object tool 1001, orientation information and position information of the object are acquired. From the trowel tool 1002, position information of the tool is acquired. Further, from the shape information of the object which is attribute data of the object to be edited (i.e., the displayed object) which has been acquired in advance and the surface attribute information of the object, the orientation information and the position information of the object and the position information of the tool which are stored in the data memory 103 (shown in FIG. 2), calculation processing 1003 to calculate the degree of deformation is executed. On the basis of this calculation, processing for changing the attribute information (i.e., deformation processing 1004) is executed. In combination with this processing, rendering processing 105 for generating a display picture with respect to the picture display unit 110 is executed. Thus, a rendering processing result is stored in the memory for the display (i.e., the frame memory 104 of FIG. 2) and is displayed on the picture display unit 110.

Figure 11:
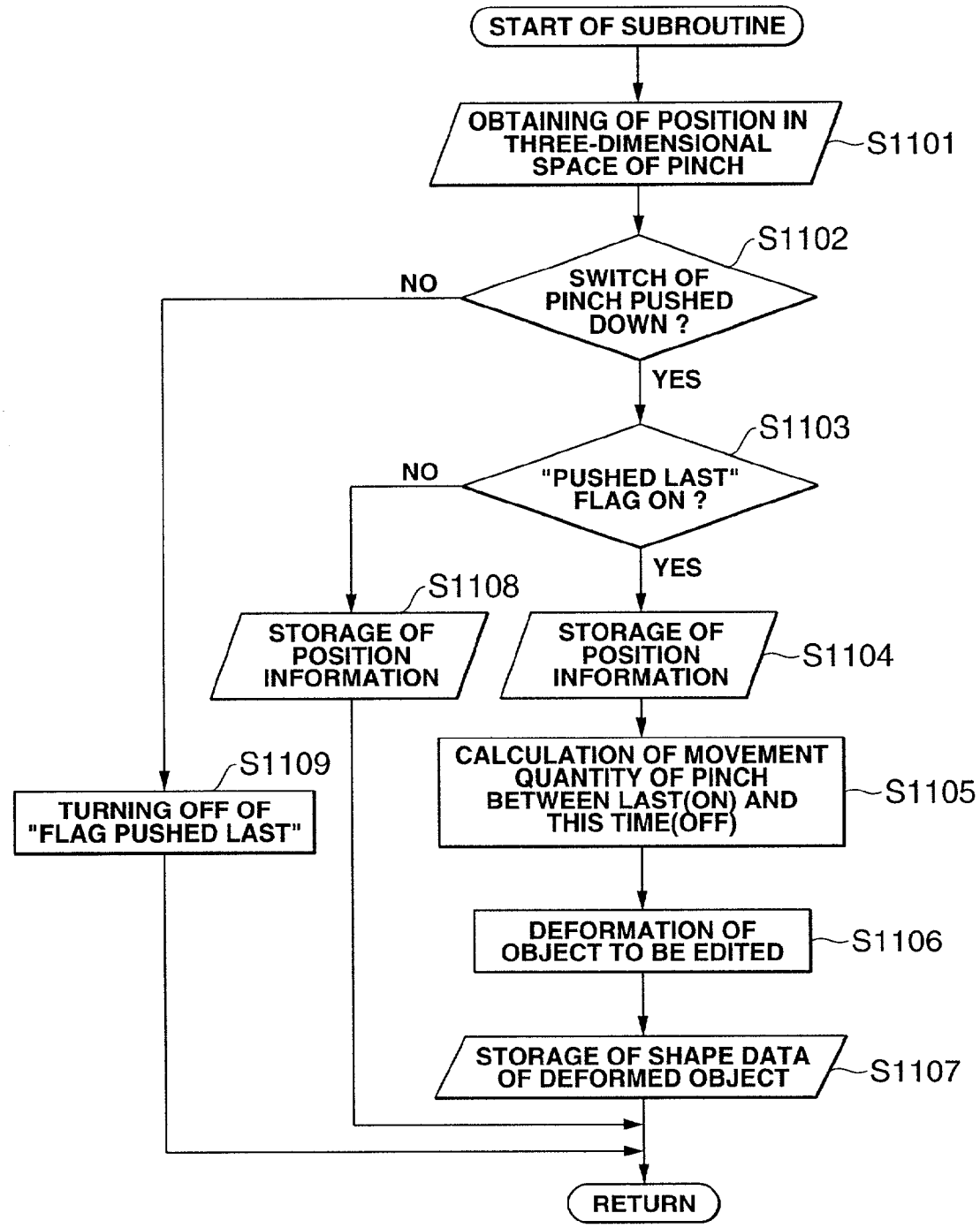
FIG. 11 is a flowchart illustrating processing where a pinch is used as an editing tool in a three-dimensional model processing apparatus according to an embodiment of the present invention.

FIG. 11 is a flowchart illustrating processing using a pinch or tongs as a pull tool to perform deformation of the displayed object. Step S1101 is a step for obtaining position data and orientation data in the three-dimensional space of the pinch or tongs used as the pull tool. As previously described, such data are data obtained on the basis of respective sensor outputs in accordance with type of input unit utilized.

In step S1102, a determination is made as to whether or not a switch of the pinch is pushed down. The pinch used a pull tool in this embodiment is configured with a switch for determining the start point and the end point of the pull operation. The position of the pool tool at the point when the switch is pushed down is either the start point ("ON") or the end point ("OFF") of the pull operation with respect to the displayed object. When it is determined in step S1102 that the switch is not pushed down, processing for turning OFF "flag to show it was pushed down last" is executed at step S1109 thereafter to execute processing to return to the end position (i.e., the flow start position).

When it is determined at the step S1102 that the switch has been pushed down, processing proceeds to step S1103, at which point it is determined whether or not "flag to show it was pushed down last" is turned ON. Where "flag to show it was pushed down last" is not turned "ON", it is judged that the push down of the switch at this time is "ON", (i.e., the current position is the start position of the pull operation). At step S1108, processing for storing position information of the pull tool of switch-pushing-down-position into the data memory 103 to return to the flow start position is executed.

When it is determined at the step S1103 that "flag to show it was pushed down last" is turned ON, it is determined that the current switch pushing down of this time is "OFF" and this time period is the execution period of the pull operation. At step S1104, position information of the switch pushing position (i.e., position information as the end position of the pull operation) is stored into the data memory 103.

In the subsequent step S1105, a movement quantity of the pinch used as the pull tool from the last switch-pushing-down-point to the switch-pushing-down-point of this time is calculated. This movement quantity is the effective processing period of the pull operation. In the subsequent step S1106, deformation processing of the object is executed on the basis of the movement quantity determined at the step S1105. At step S1107, new attribute information obtained by deformation processing (i.e., shape data of the object is stored into the data memory). Display of the object is carried out on the picture display unit 110 on the basis of the new attribute information.

Figure 12:
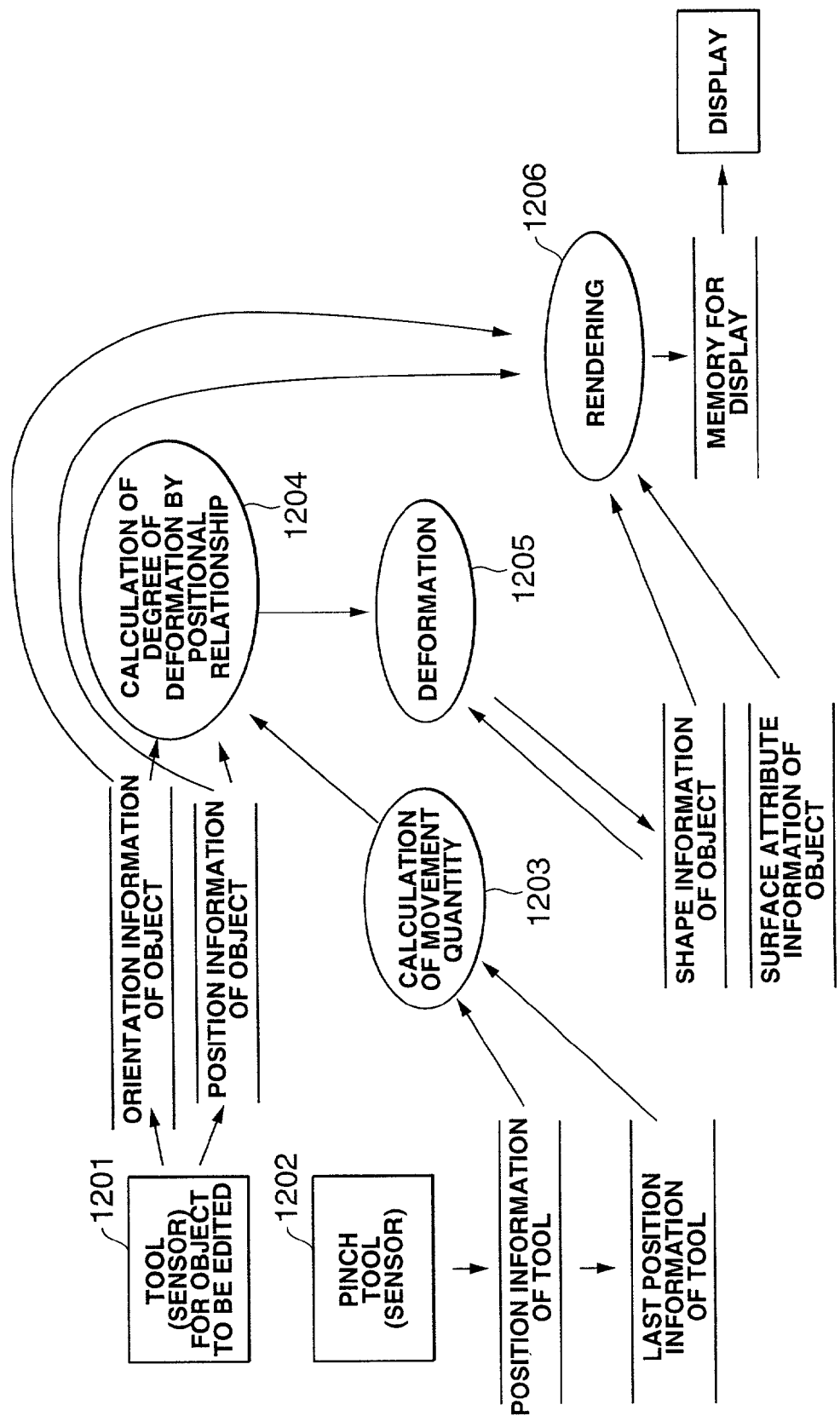
FIG. 12 is a data flow diagram illustrating processing where a pinch is used as an editing tool in a three-dimensional model processing apparatus according to an embodiment of the present invention.

In order to supplement the explanation of the flowchart shown in FIG. 11, explanation will be given with reference to the data flow diagram of FIG. 12 using the pinch as a pull tool. In FIG. 12, processing is started by operation of the object tool (sensor) 1201 as an actor object and pinch tool (sensor) 1202 as an actor object. From the object tool 1201, orientation information and position information of the object are acquired. From the pinch tool 1202, position information of the tool and the last position information of the tool are acquired. This information corresponds to the start position and the end position of the pull operation by the pinch or the tongs.

On the basis of the acquired position information of the tool, calculation processing 1203 to calculate a movement quantity of the tool is executed. On the basis of the calculated movement quantity and position information and orientation information of the object, calculation processing 1204 to calculate a deformation quantity of the object is executed.

Further, on the basis of the calculation processing result of the deformation quantity, change processing to modify the attribute information (i.e., deformation processing 1205) is executed. In combination with this processing, rendering processing 1206 for generating a display picture with respect to the picture display unit 110 is executed. Thus, a rendering processing result is stored into the memory for the display (i.e., the frame memory 104 of FIG. 2) and is displayed on the picture display unit 110.

Figure 13:
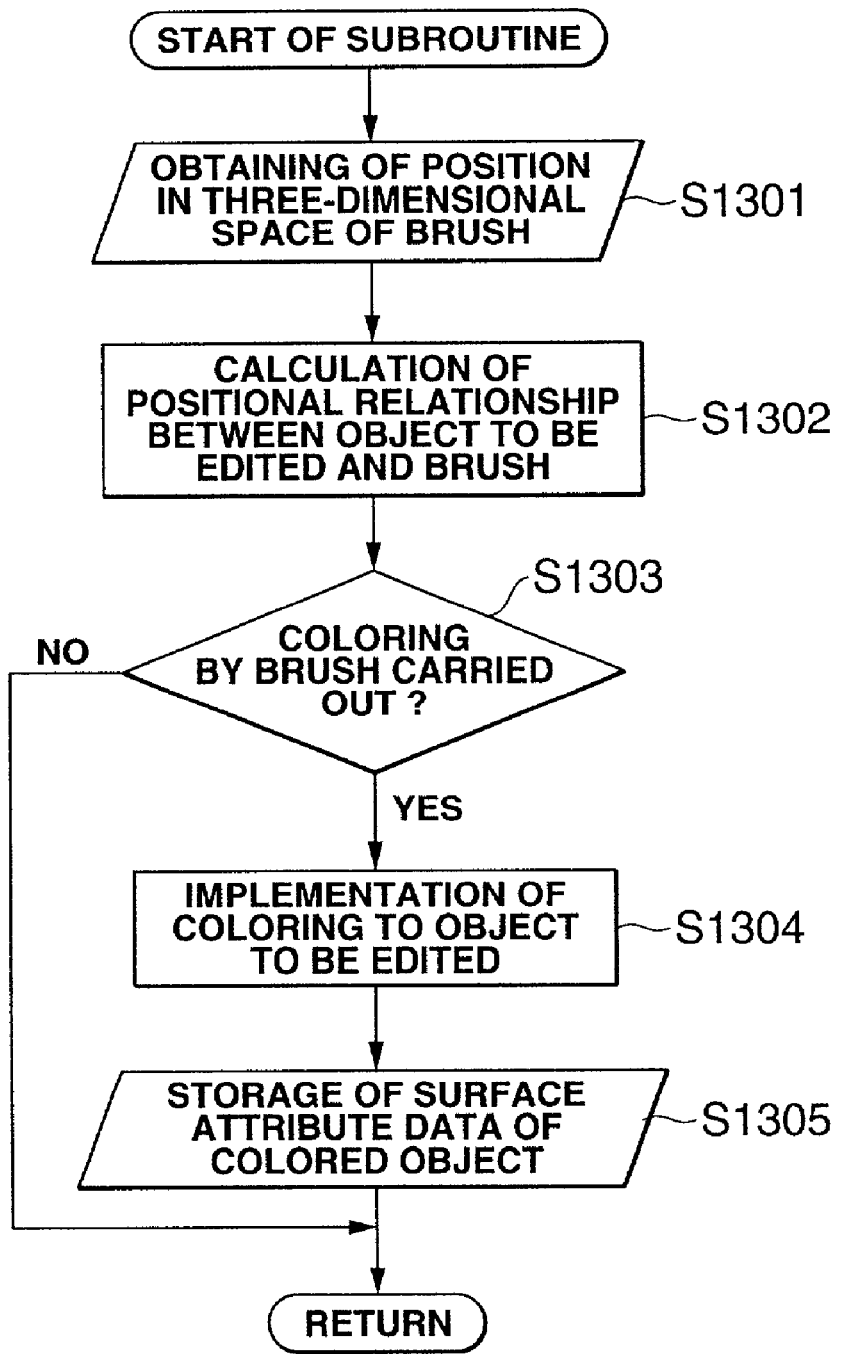
FIG. 13 is a flowchart illustrating processing where a brush is used as an editing tool in a three-dimensional model processing apparatus according to an embodiment of the present invention.

FIG. 13 is a flowchart illustrating processing using a brush tool as a coloring tool to apply coloring to the displayed object. Step S1301 is a step for obtaining position/orientation data on the three-dimensional space of the brush used as the coloring tool. As previously describe, such data are obtained on the basis of respective sensor outputs in accordance with the type of input unit utilized.

In step S1302, a space relationship/relative position between the displayed object and the editing tool is determined from the position/orientation data of the displayed object (acquired in step S801 of FIG. 8) and the position/orientation data of the brush as the editing tool (obtained in step S1301).

In step S1303, a determination is made as to whether or not deformation of the displayed object by the brush as the editing tool brush has been carried out. The determination may be such that, for example, similarly to the previously described pull tool pinch, a switch is provided at the brush to detect the push-down of the switch. Alternatively, a configuration may be employed to carry out coloring by the brush when the distance between the displayed object and the editing tool (determined in step S1302) is less than a predetermined distance.

At the subsequent step S1304, coloring processing with respect to the object is executed. In an embodiment, the operator sets the color used in this step in advance. After coloring processing of the displayed object is executed, the rewritten attribute data of the displayed object including the colored result is stored in the data memory 103 or the external storage unit 106 (shown in FIG. 2) in step S1305.

Figure 14:
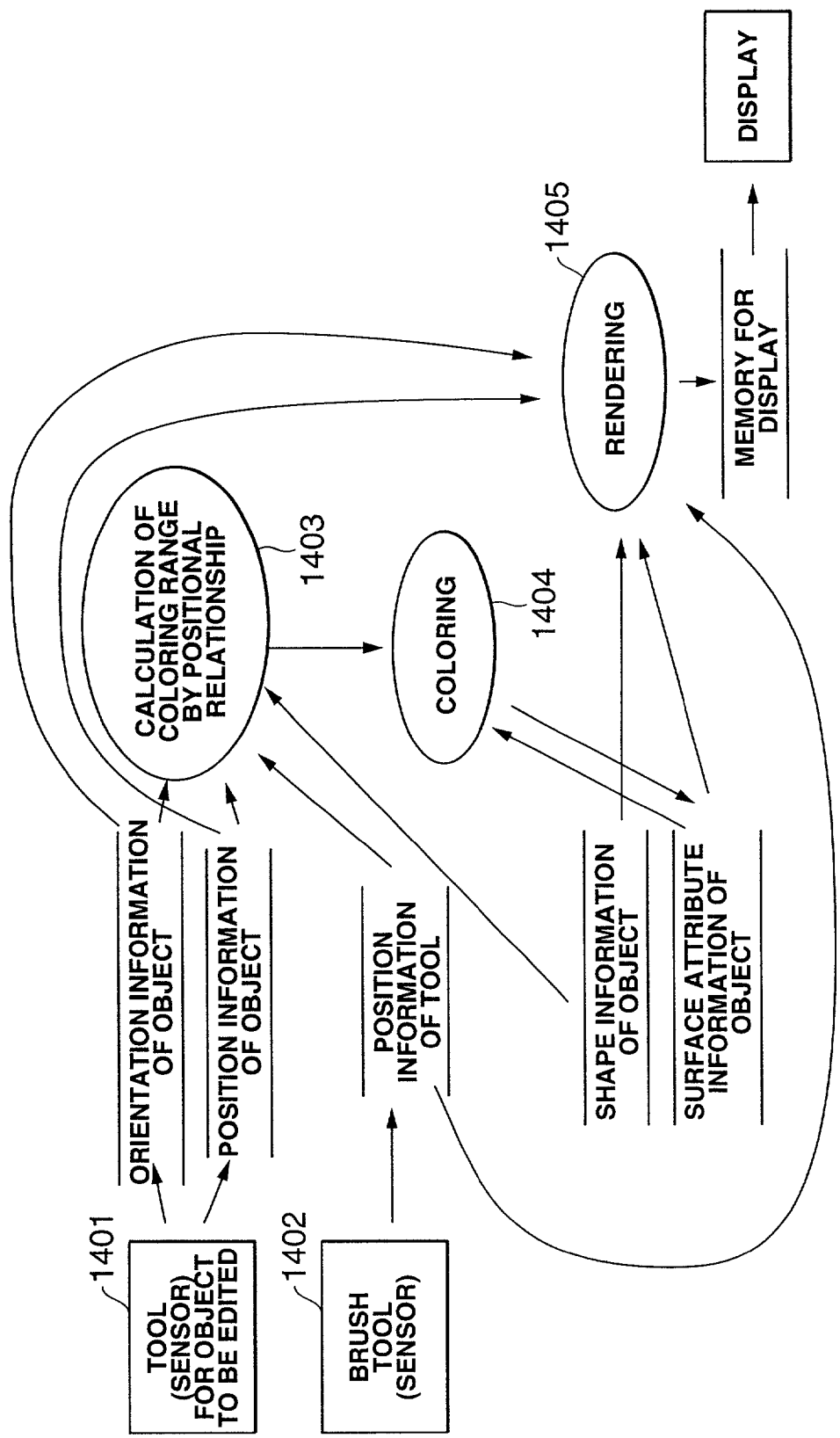
FIG. 14 is a data flow diagram illustrating processing where a brush is used as an editing tool in a three-dimensional model processing apparatus according to an embodiment of the present invention.

In order to supplement the explanation of the flowchart shown in FIG. 13, explanation will be given with reference to the data flow diagram of FIG. 14 using the brush as a coloring tool. In the data flow of FIG. 14, processing is started by operation of an object tool (sensor) 1401 as actor object and a brush tool (sensor) 1402 as an actor object. From the object tool 1401, orientation information and position information of the object are acquired. From the brush tool 1402, position information of the tool is acquired. Further, from the shape information of the object which is the attribute data of the displayed object which has been acquired in advance and the orientation information and the position information of the object and the position information of the tool which are stored in the data memory 103 of FIG. 2, calculation processing 1403 to calculate the coloring range is executed. On the basis of this calculation result and the surface attribute information of the object, processing for changing the attribute information (i.e., coloring processing 1404) is executed. In combination with this processing, rendering processing 1405 for generating a display picture with respect to the picture display unit 110 is executed, and a rendering processing result is stored into memory for the display (i.e., the frame memory 104 of FIG. 2) and is displayed on the picture display unit 110.

Figure 15:
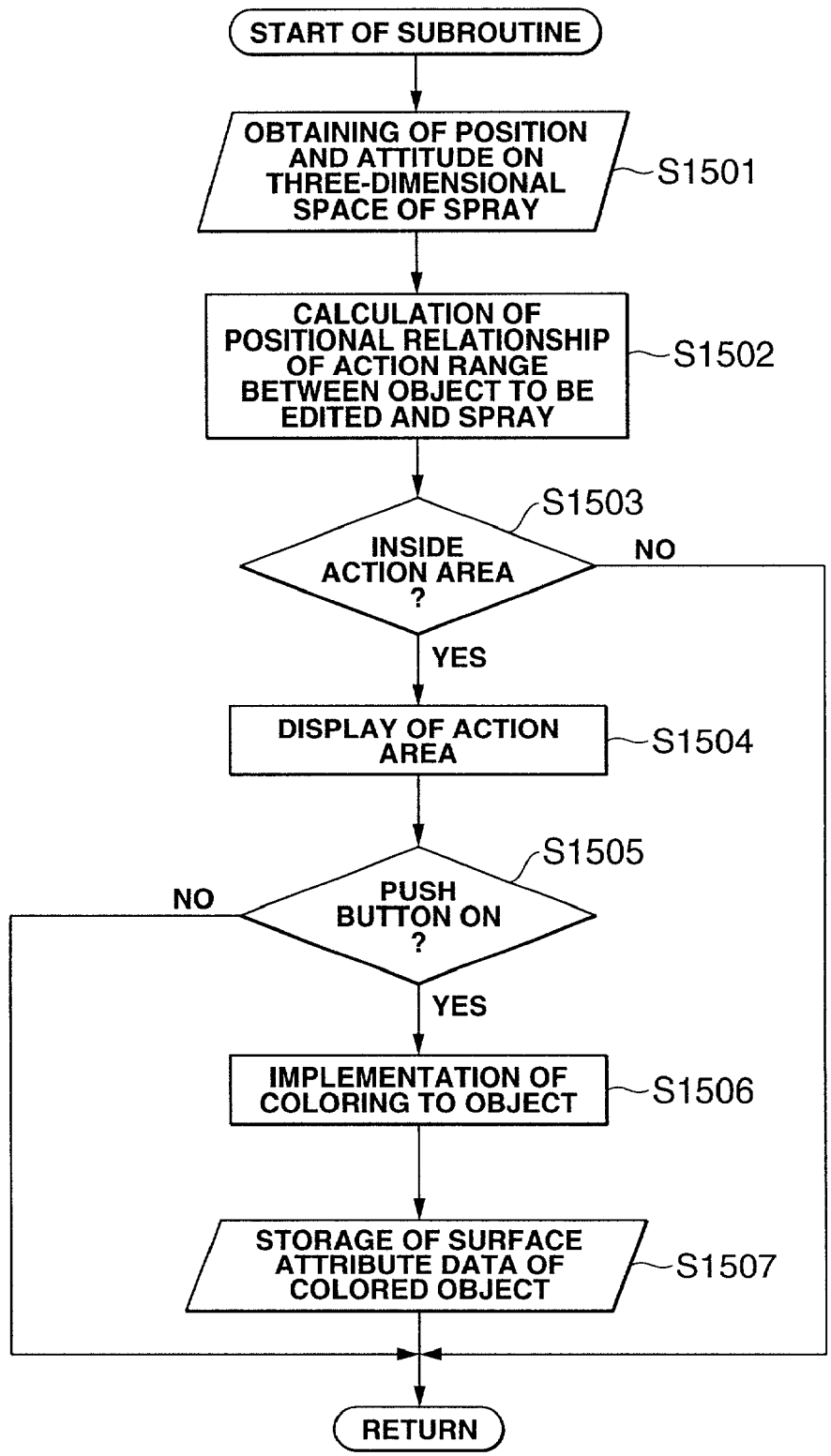
FIG. 15 is a flowchart illustrating processing where a spray is used as an editing tool in a three-dimensional model processing apparatus according to an embodiment of the present invention.

FIG. 15 is a flowchart illustrating processing using a spray tool as a coloring tool to apply coloring to the displayed object. Step S1501 is step for obtaining position/orientation data in the three-dimensional space of the spray (i.e., the spray tool having the shape of a can of spray paint) used as a coloring tool. As previously described, such data are data obtained on the basis of respective sensor outputs in accordance with the type of input unit utilized.

In step S1502, the positional relationship of the action range between the displayed object and the spray tool is determined from position/orientation data of the displayed object (acquired in step S801 of FIG. 8) and position/orientation data of the spray tool as the editing tool (obtained in step S1501).

In step S1503, a determination is made as to whether or not the positional relationship of the action range between the displayed object and the spray tool (determined in step S1502) falls within the action area of the spray tool as the editing tool. In an embodiment, the area which can be colored by the spray tool is set in advance. For the displayed object to be colored, the positional relationship of action range between the displayed and the spray tool must fall within the action area of the spray tool as the editing tool. Thus, the action area of the spray tool is set in advance as attribute data of the editing tool.

Figure 17B:
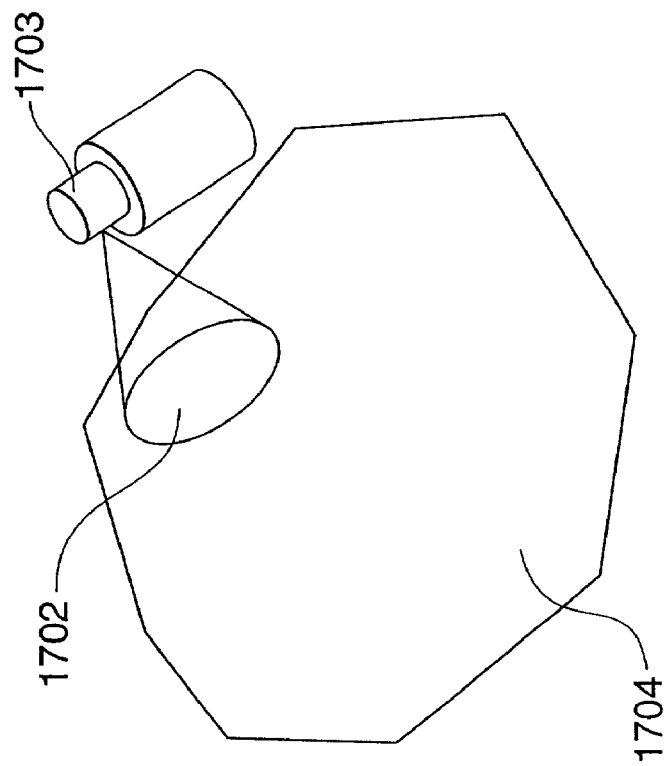
FIG. 17B is a perspective view showing a coloring range in an embodiment where spray is used as an editing tool.
Figure 17A:
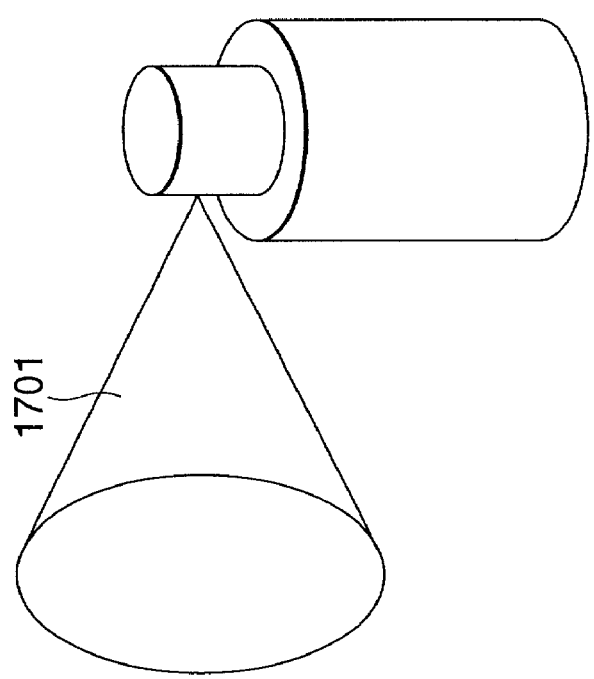
FIG. 17A is a perspective view showing an action area in an embodiment where a spray is used as an editing tool in a three-dimensional model processing apparatus according to the present invention.

In an embodiment, the action area of the spray tool is set as a conical area 1701 in which predetermined points of the spray tool are caused to be vertices as indicated by FIG. 17A, for example, and a coloring range 1702 with respect to an object is set within the action area on the object 1704 surface as shown in FIG. 17B. Push button 1703 is provided on the spray tool, and the coloring range 1702 is set on the basis of the positional relationship at the point when the push button 1703 is pushed down.

When it is determined at the step S1503 that the corresponding area is outside the action area of the spray tool, coloring processing by the spray tool is not executed. As a result, processing is completed. Thus, the routine is returned to the start position. When it is determined in step S1503 that the corresponding area is inside the action area of the spray tool, the action area is displayed on the picture display unit 110 at step S1504.

In step S1505, the switch of the spray tool is pushed down, and a determination is made as to whether or not the switch is turned ON. The switch being ON initiates coloring processing with respect to the displayed object in step S1506. In an embodiment, the operator sets the color used in this step in advance. After coloring processing of the displayed object is executed in step S1506, rewritten attribute data of the displayed object including the colored result is stored into the data memory 103 or the external storage unit 106 (shown in FIG. 2) in step S1507.

Figure 16:
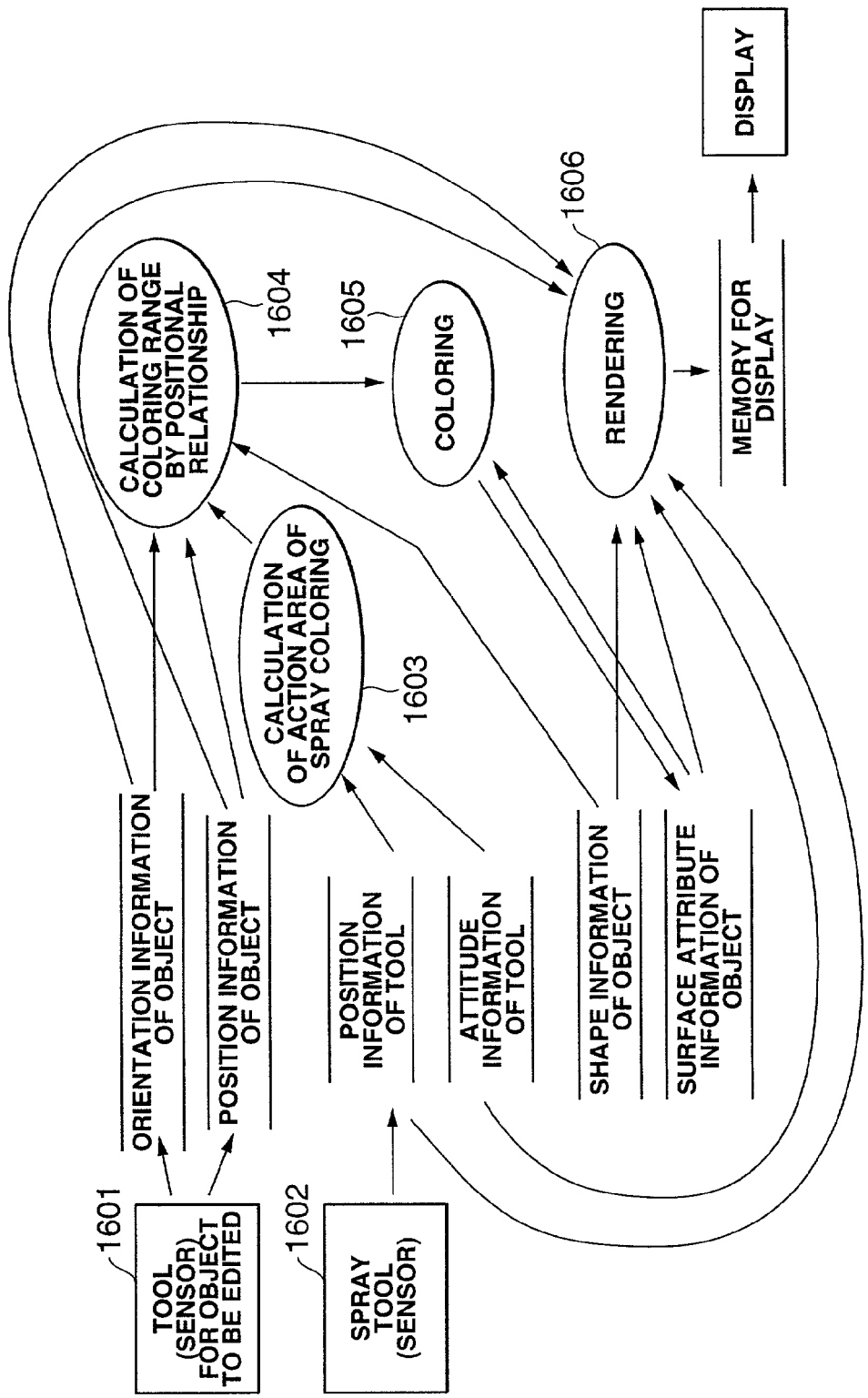
FIG. 16 is a data flow diagram illustrating processing where a spray is used as an editing tool in a three-dimensional model processing apparatus according to an embodiment of the present invention.

In order to supplement the explanation of the flowchart shown in FIG. 15, explanation will be given with reference to the data flow diagram of FIG. 16 using the spray tool as a coloring tool. In the data flow of FIG. 16, processing is started by operation of the object tool (sensor) 1601 as actor object and the spray tool (sensor) 1602 as an actor object. From the object tool 1601, orientation information and position information of the object are acquired. From the spray tool 1602, position information and orientation information of the tool are acquired. On the basis of the position information and the orientation information of the spray tool, calculation processing 1603 to calculate the action area which can be colored by the spray tool is executed.

Further, calculation processing 1604 to calculate the coloring range is carried out on the basis of the shape information of the object which is the attribute data of the displayed object which has been acquired in advance and the orientation information and the position information of the object and the calculated action area of the tool spray which are stored in the data memory 103 of FIG. 2. Processing to modify the attribute information (i.e., coloring processing 1605) is executed on the basis of this calculation. In combination with this processing, rendering processing 1606 for generating a display picture with respect to the picture display unit 110 is executed, and a rendering processing result is stored into the memory for the display (i.e., the frame memory 104 of FIG. 2) and is displayed on the picture display unit 110.

As stated above, in accordance with a three-dimensional model processing apparatus according to an embodiment of the present invention, the operator uses the object tool corresponding to the displayed object and various dedicated tools to execute a change in the relative position between both tools, whereby the processing unit executes processing determined in advance by the dedicated tool selected. As a result, processing corresponding to the respective editing tools such as deformation, coloring, and the like (i.e., an attribute change) is carried out with respect to the displayed object, and the display of its result is executed. Accordingly, the operator can execute various processing with such a feeling to directly implement processing to the displayed object.

Figure 18C:
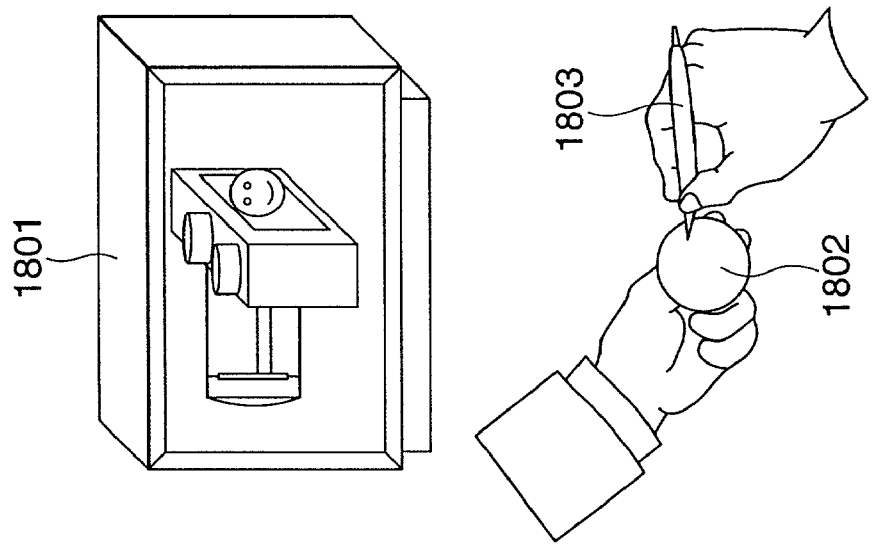
FIGS. 18A, 18B and 18C are perspective views showing embodiments of a three-dimensional model processing apparatus according to the present invention.
Figure 18B:
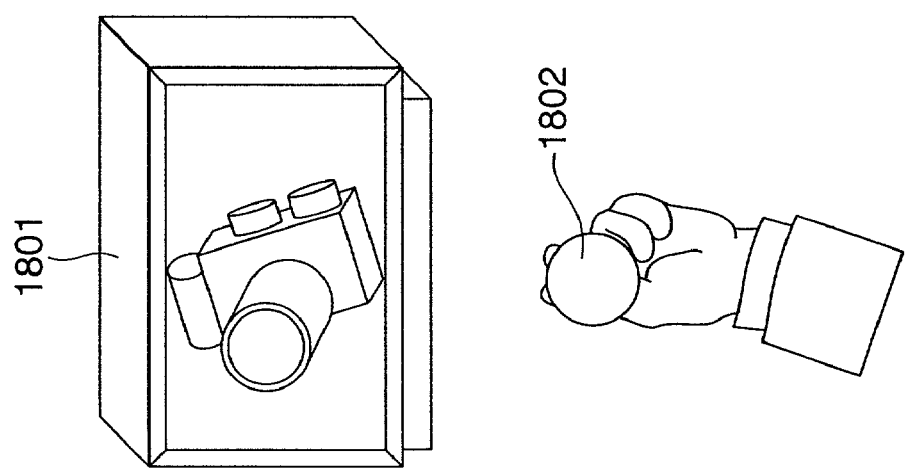
Figure 18A:
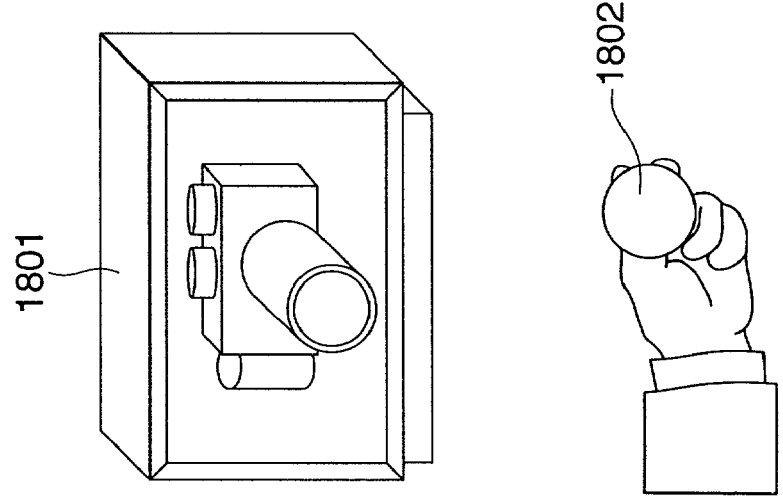

Explanation will be given in connection with a practical embodiment of an application of a three-dimensional model processing apparatus according to the present invention. In an embodiment, a three-dimensional model processing apparatus according to the present invention as applied to on-line shopping using a communication network such as the internet or the like is shown in FIGS. 18A to 18C.

In an embodiment, a three-dimensional model processing apparatus of this invention is contained within, for example, personal computers of users to display, on display 1801, goods from a provider who provides on-line shopping. Such goods display may be carried out by storing three-dimensional picture data relating to the goods provided from the provider through a network into a storage unit such as a memory, a hard disk, and the like within the computer of the user to read out such data. Alternatively, goods display may be carried out by using data stored on a medium, for example, CD, DVD, or the like that the goods provider provides.

The user who studies the goods displayed as a three-dimensional picture on the display 1801 holds, by one hand, the object tool 1802 corresponding to the display goods and holds, by the other hand, the operation tool 1803 for executing various processing with respect to the goods. A user studying the goods can relatively operate the object tool 1802 and the operation tool 1803 to execute processing corresponding to respective operation tools with respect to the goods displayed on the display. For example, by changing the angle/orientation of the object tool 1802, the article displayed on display is displayed in the state where the angle/orientation is changed in a manner from FIG. 18A to FIG. 18B. Thus, the user can observe the goods or articles from all angles.

Further, for example, a previously described push tool may be used as the operation tool 1803, and a push operation may be executed by the tool which pushes each operation button of the object tool corresponding to, for example, a video camera. Thus, as shown in FIG. 18C, it is possible to employ such a configuration that an operation button of the video camera on the display 1801 is pushed down such that processing corresponding to the depressed operation button is executed on the display.

In an embodiment, each operation button may be depressed and executed on the display by employing a configuration such that each switch position of the displayed object is specified on the basis of position information of the push tool to execute a processing program corresponding to the specified switch. By executing the program corresponding to the depressed switch, operation of the goods displayed in display 1801 may be carried out. In a manner stated above, a user can actually obtain a feeling of practically handling or holding an article and operating it by relative operation between the object tool and the operation tool.

Figure 19:
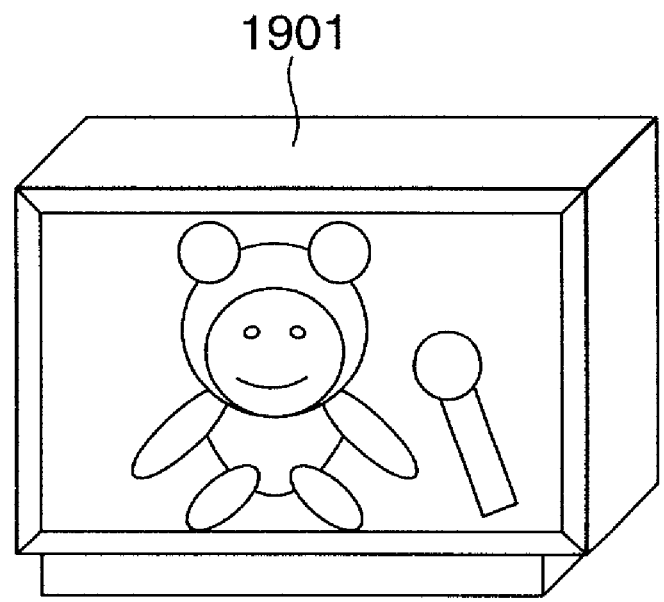
FIG. 19 is a perspective view showing an embodiment of a three-dimensional model processing apparatus according to the present invention.
Figure 19:
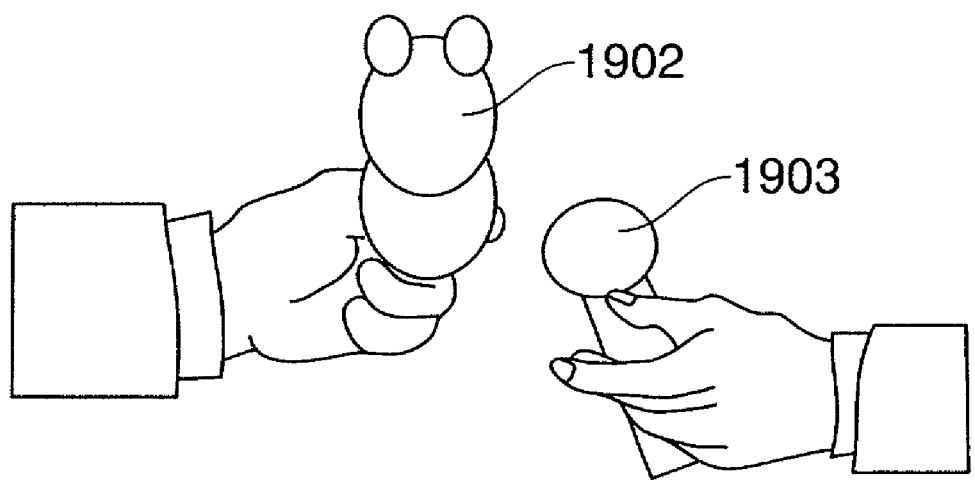

Further, explanation will be given in connection with a different practical embodiment of an application of a three-dimensional model processing apparatus according to the present invention. FIG. 19 constitutes a three-dimensional model processing apparatus according to an embodiment of the present invention within, for example, a personal computer to display a virtual pet on a display 1901 of the personal computer. An operator holds, by one hand, an object tool 1902 corresponding to the display of the virtual pet and holds, by the other hand, various editing tools 1903. The operator operates the editing tool 1903 with respect to the object tool 1902 to execute various processing.

For example, a microphone tool may be configured as the editing tool. When the microphone tool is caused to be close to the object tool 1902, the displayed pet outputs voice through a speaker. This is realized by executing a subprogram set in correspondence with the microphone tool such that when the distance between the microphone tool and the object tool 1902 is below a predetermined value, processing is executed to output voice. Further, a setting may included that executes processing to change the tone of voice on the basis of the orientation information of the object tool.

In an embodiment, various tools such as kennel, feed, and the like are set as the editing tool to run subprograms to carry out various processing in accordance with the various types of tools.

As, for example, processing programs shown in FIGS. 8–16 in the three-dimensional model processing apparatus of this invention, a program stored in the program memory 102 shown in FIG. 2 may be applied, or a configuration may be employed in which a program is stored in various memory media such as CD-ROM, CD-R, CD-RW, DVD-RAM, DVD-RW, DVD+RW, MO, hard disk, floppy disk, the like and combinations thereof. For example, in an embodiment of goods being sold by a goods provider, a processing program may be stored in combination on a CD with a goods catalog to offer it to a user. Thus, the user sets the CD to display goods on a display to execute processing using various editing tools, and a processing program corresponding to the selected tool is called and is executed. As a result, processing is carried out in accordance with the selected tool. Thus, an embodiment for allowing goods displayed on a display to execute various operations is realized.

As stated above, in accordance with an embodiment of a three-dimensional model processing apparatus and a three-dimensional model processing method of the present invention, there a configuration may be employed in which an operator operates various editing tools to execute processing determined by a corresponding tool. Accordingly, the operator can execute various processing with a feeling as if he actually handles or holds the displayed object.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A three-dimensional model processing apparatus comprising:
   display means for displaying an object;
   an object tool representing the displayed object, wherein the object tool is adapted to be manipulated in three dimensions such that the position and orientation of the object tool can be changed;
   an editing tool adapted to be manipulated in three dimensions such that a relative position between the editing tool and the object tool can be changed; and
   processing means for detecting relative position information corresponding to the relative position between the editing tool and the object tool, and executing processing determined by the editing tool to modify attribute information of the displayed object on the basis of the detected relative position information, thereby altering the appearance of the displayed object, wherein the relative position information includes at least one of a relative distance between the object tool and the editing tool and a relative angle between the object tool and the editing tool, and wherein the attribute information of the displayed object is at least sound.

2. The three-dimensional model processing apparatus as claimed in claim 1, wherein the processing means is configured to detect position information of the object tool based on changes in the position and the orientation of the object tool to modify the attribute information of the displayed object on the basis of the detected position information thereby altering the appearance of the displayed objects.

3. The three-dimensional model processing apparatus as claimed in claim 1, wherein the processing means is configured to executing processing corresponding to a plurality of editing tools.

4. The three-dimensional model processing apparatus as claimed in claim 1, wherein the attribute information of the displayed object is further at least one of shape and color.

5. The three-dimensional model processing apparatus as claimed in claim 1, wherein the processing means is configured to execute a functional operation of the displayed object as processing determined by the editing tool.

6. A three-dimensional model processing method for executing various processing, the three-dimensional model processing method comprising the steps of:
   providing an object displayed on a display means;
   providing an object tool representing the displayed object, wherein the object tool is adapted to be manipulated in three dimensions such that the position and orientation of the object tool can be changed;
   providing an editing tool adapted to be manipulated in three dimensions such that a relative position between the editing tool and the object tool can be changed;
   detecting relative position information corresponding to the relative position between the object tool the editing tool;
   executing processing determined by the editing tool to modify attribute information of the displayed object on the basis of the detected relative position information; and
   updating the appearance of the displayed object based on the modified attribute information, wherein the relative position information includes at least one of a relative distance between the object tool and the editing tool and a relative angle between the object tool and the editing tool, and wherein the attribute information of the displayed object is at least sound.

7. The three-dimensional model processing method as claimed in claim 6, the method further comprising the steps of:
   detecting position information of the changed object tool based on changes in the position and the orientation of the object tool;
   modifying the attribute information of the displayed object based on the position information; and
   updating the appearance of the displayed object based on the modified attribute information.

8. The three-dimensional model processing method as claimed in claim 6, wherein the editing tool provided is selected from a plurality of editing tools.

9. The three-dimensional model processing method as claimed in claim 6, wherein the attribute information of the displayed object is further at least one of shape and color.

10. The three-dimensional model processing method as claimed in claim 6, the method further comprising the step of executing a functional operation of the displayed object as processing determined by the editing tool.

11. A computer readable medium storing a computer readable program for providing three-dimensional model processing, the computer readable program comprising the steps of:
   providing an object displayed on a display means;
   providing an object tool representing the displayed object, wherein the object tool is adapted to be manipulated in three dimensions such that the position and orientation of the object tool can be changed;
   providing an editing tool adapted to be manipulated in three dimensions such that a relative position between the editing tool and the object tool can be changed;
   detecting relative position information corresponding to the relative position between the object tool and the editing tool;
   executing processing determined by the editing tool to modify attribute information of the displayed object on the basis of the detected relative position information; and
   updating the appearance of the displayed object based on the modified attribute information, wherein the relative position information includes at least one of a relative distance between the object tool and the editing tool and a relative angle between the object tool and the editing tool, and wherein the attribute information of the displayed object is at least sound.

* * * * *